Aug. 1, 1967 R. D. HOMAN 3,333,674
CASE LOADER
Filed Sept. 29, 1965 3 Sheets-Sheet 1
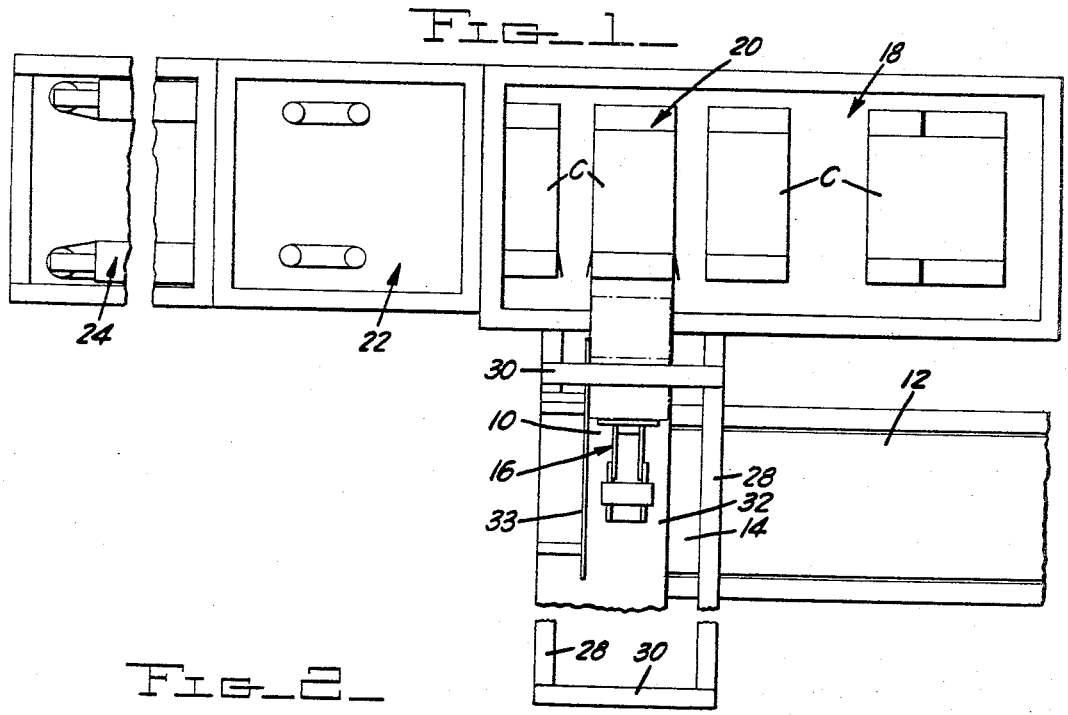
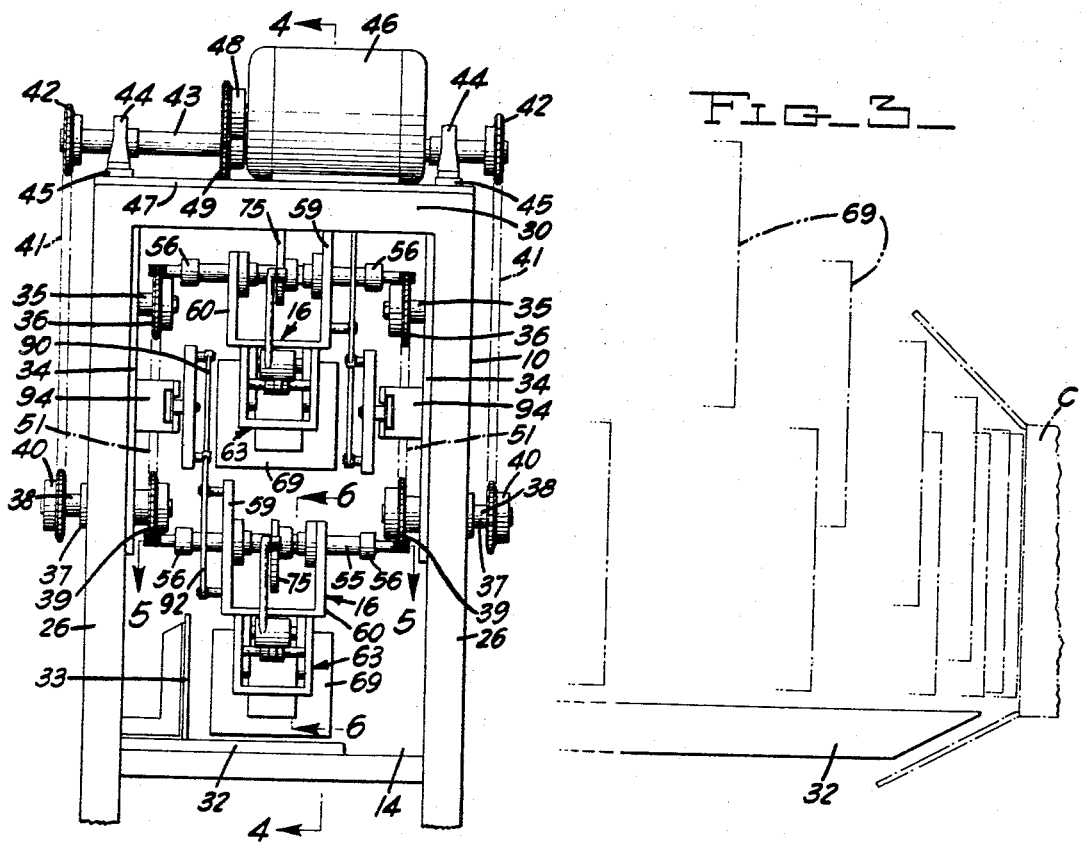

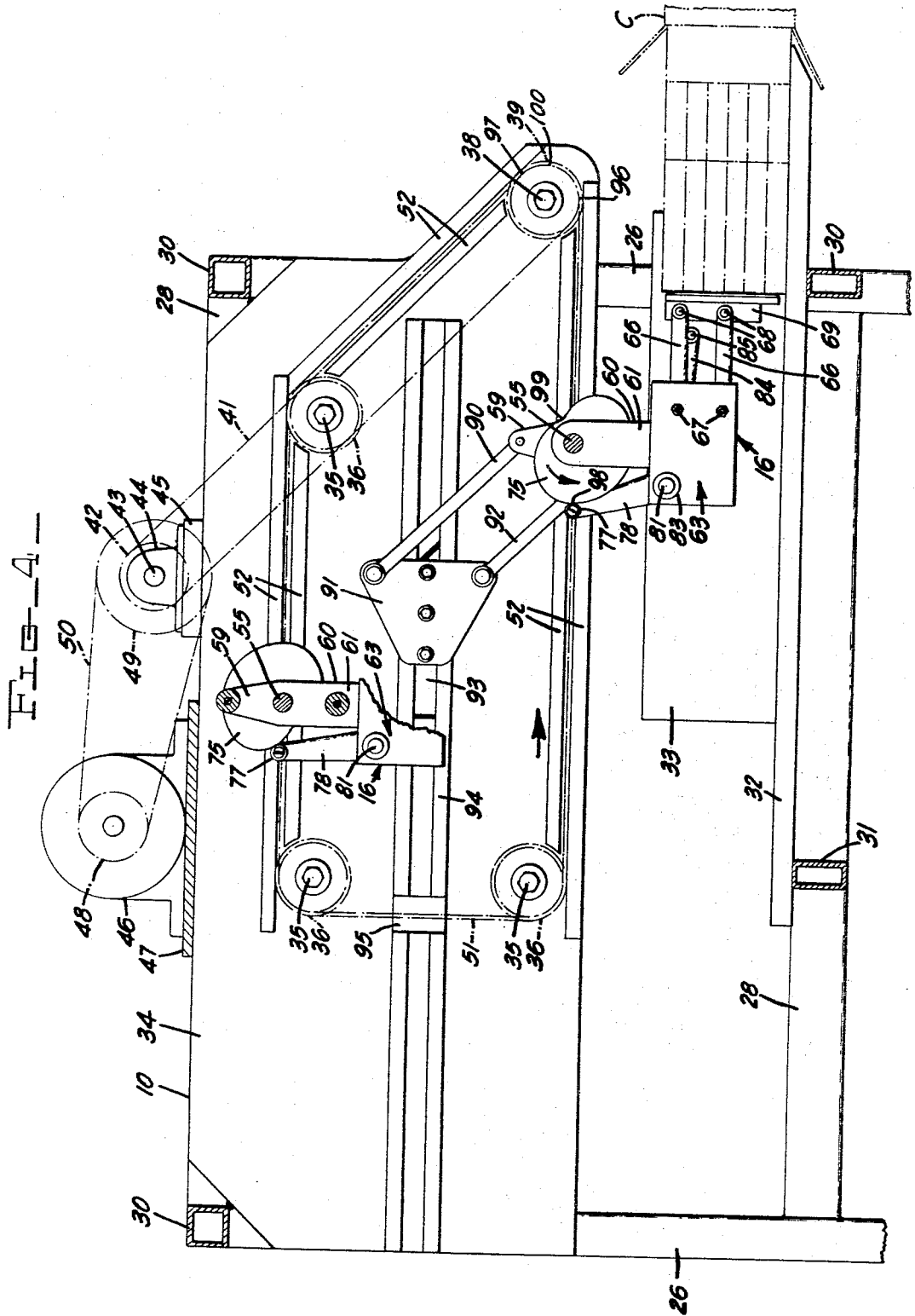

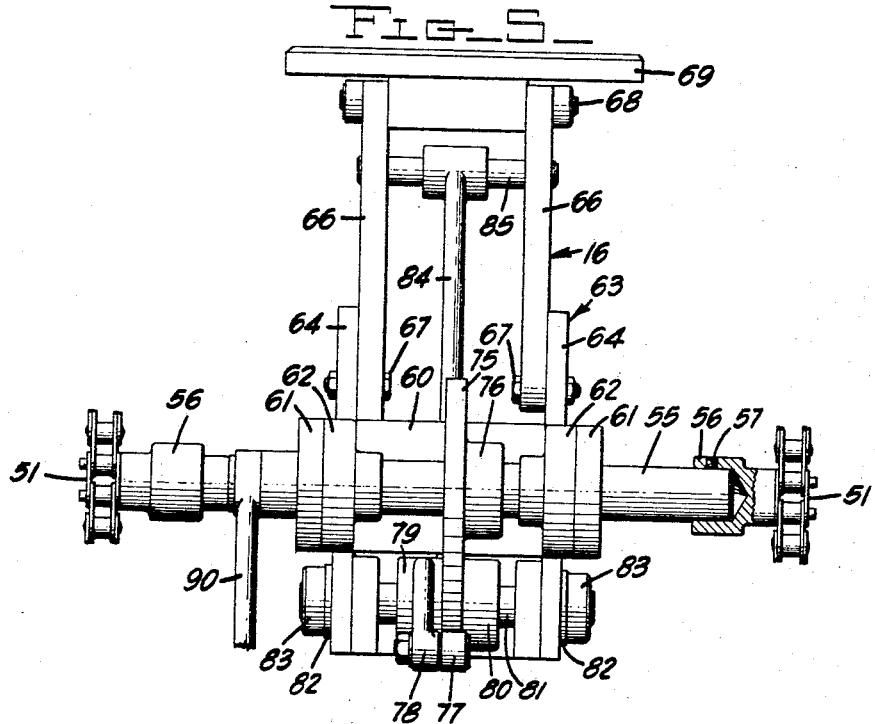
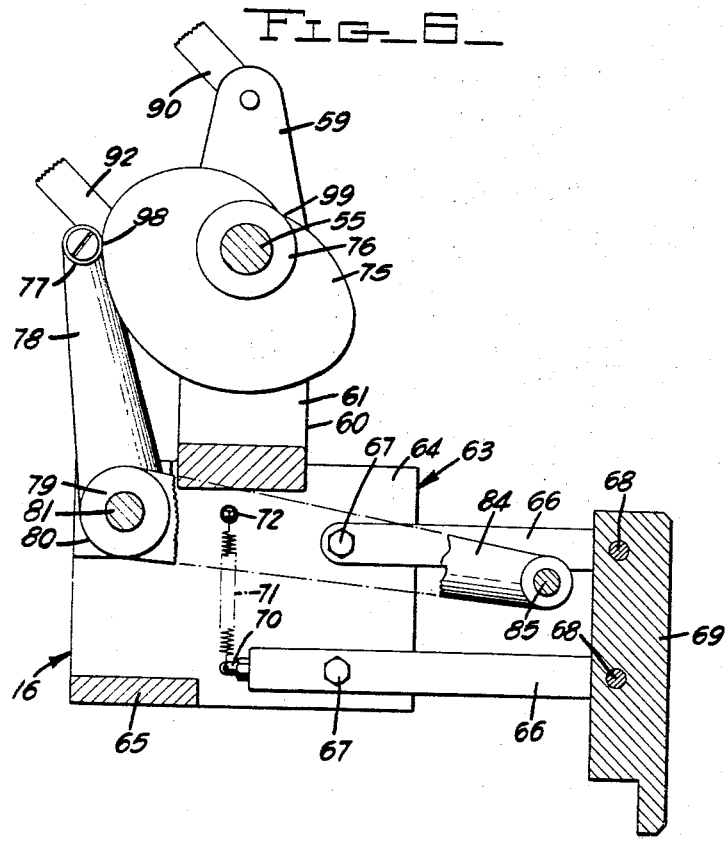
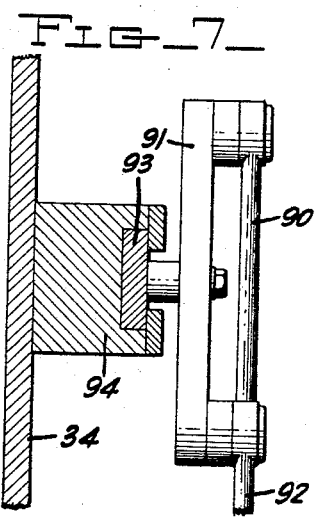

United States Patent Office 3,333,674
Patented Aug. 1, 1967

3,333,674
CASE LOADER
Richard D. Homan, Bowmansville, Pa., assignor to Textile Machine Works, Wyomissing, Pa., a corporation of Pennsylvania
Filed Sept. 29, 1965, Ser. No. 491,232
5 Claims. (Cl. 198—24)

The instant invention relates to apparatus for loading cans, packages, or other items, hereinafter generically referred to as "articles" into shipping cases or the like and more particularly is concerned with such apparatus incorporating loading or pusher members supported for movement in a continuous path.

Prior to the instant invention it has been known to employ article loading apparatus in which one or more pusher or loading members are supported for movement in a closed path including a loading stroke, during which each such member forces a group of articles along a dead plate or the like toward and into a case through a side or other wall with opened closure flaps. Following the loading operation and in continuation of the closed path the pusher member travels through a return stroke at another level remote from the dead plate whereby a second group of articles may be placed on the dead plate in loading position during such return movement. Conventionally in loading operations the opened case flaps extend at an angle to the walls of the case to which they are attached. For example the flaps attached to what are the top and bottom walls when the case is in loading position extend upwardly and downwardly respectively and are held at an angle of approximately forty-five degrees to the vertical plane of the box end. In the prior loading devices of the type mentioned difficulty has been encountered due to the interference of the pusher member with the top or bottom flap as the pusher member is elevated or lowered, as the case may be, to its return path at the end of the loading stroke.

The instant invention is directed to and has for its principal object the provision of an improved loading apparatus of the type referred to which avoids such problems.

More particularly an object of the invention is the provision of a loading apparatus including means whereby each pusher member, whether there may be one or several, is retracted from the case after loading is completed and thereafter in its return movement is moved upwardly and rearwardly in an inclined path whereby any interference with the case flaps is avoided.

Briefly described the apparatus of the instant invention attaining the foregoing objects comprises one or more pusher members carried by an endless conveyor supported by sprockets or the like and traveling in a closed path including a lower substantially horizontal run overlying a dead plate or other means receiving the articles to be loaded and terminating adjacent the open side of a case positioned for loading. Thereafter the path extends around end sprockets and into a rearwardly and upwardly inclined run. Each pusher member is so supported on the conveying means and is under such control that at the substantial completion of the loading run or stroke, namely at the point where the conveyor starts its upward travel around the end sprockets the pusher member is gradually lowered relatively to the conveyor whereby it remains at, at least substantially, its previous level relative to the dead plate during the remainder of the loading stroke and during the start of the return movement. As a result the pusher member is retracted from the case before it begins its upward movement and further the latter movement is at substantially the same angle as the upper flap of the case whereby any interference between the member and the case flap is avoided.

The invention will be more fully understood and further objects and advantages thereof will become apparent when reference is made to the more detailed description to follow and to the accompanying drawings in which:

FIG. 1 is a diagrammatic plan view illustrating certain conventional elements of a case loading system and the position of the apparatus of the instant invention in such system.

FIG. 2 is an end elevational view of the loading apparatus of the instant invention;

FIG. 3 is a diagrammatic view illustrating various positions of a pusher element of the apparatus of FIG. 2 during its approach to and withdrawal from a case being loaded;

FIG. 4 is a sectional view on an enlarged scale taken on the line 4—4 of FIG. 2 looking in the direction indicated by the arrows;

FIG. 5 is a sectional view on an enlarged scale taken on the line 5—5 of FIG. 2 looking in the direction indicated by the arrows;

FIG. 6 is an enlarged sectional view taken on the line 6—6 of FIG. 2 and looking in the direction indicated by the arrows; and FIG. 7 is a detail view on an enlarged scale partly in section and partly in elevation of a portion of the apparatus shown in FIG. 2.

Referring now to the drawings and first particularly to FIG. 1 a case loading apparatus 10 embodying the instant invention is shown as incorporated in a typical case loading system. The system illustrated includes a conveyor 12 on which groups of articles to be loading are assembled, the conveyor being adapted to deliver successive groups of the assembled articles onto a dead plate 14 of the case loading apparatus in position to be contacted and conveyed by one of preferably a plurality of pusher units 16. Each pusher unit is supported for movement in a closed path including a loading run or stroke as will hereinafter be explained. The system further includes a case opening station 18 in which case blanks are set up to form open ended cases C which are then conveyed to a loading station 20 with an open side aligned with the path of travel of a pusher unit 16 during its loading stroke. As is conventional in case loading apparatus the flaps forming the closure elements for the open side of the case through which the group of articles is to be inserted are, during loading operation, maintained by means (not shown) at an angle of approximately forty-five degrees to the plane of the case walls to which they are attached. Following loading the cases C are conveyed to the gluing station 22 where glue is applied to the open flaps which are then plowed or folded into closed position. Thereafter the cases are conveyed to a compressor station 24 where the glued flaps are held in closed position while the glue sets. While the case loading system briefly described above is an example of those in which the loading apparatus of the instant invention finds utility it will be understood that the apparatus may be employed in other systems.

Referring now particularly to FIGS. 2 to 7 inclusive the loading apparatus incorporating the instant invention and which may be employed in the system of FIG. 1 or otherwise comprises a frame structure including vertical frame members or posts 26, upper and lower horizontal side frame members 28 and end frame members 30. A dead plate 32 is supported on the forward one of the lower end frame members 30 and on a member 31 connecting lower side frame members 28 intermediate the ends of the device. Dead plate 32 projects beyond the forward end of the frame into proximity to an open end of a case C positioned at the loading station. A plate 33 is mounted on dead plate 32 for adjustment transversely thereof to form a backstop or positioner for the groups of articles conveyed to the dead plate by conveyor 12.

The frame structure carries side plates 34. Each of the side plates support similarly positioned stub shafts 35 on which sprockets 36 are rotatably mounted. Also secured to the side plates are bearings 37 rotatably receiving shafts 38 which project through the side plates. A sprocket 39 is keyed or otherwise secured to each shaft 38 adjacent its inner end and a similar sprocket 40 is keyed to the projecting end of each shaft. Sprockets 40 are driven through sprocket chains 41 from sprockets 42 keyed to a shaft 43 mounted in bearings 44 carried on spacer blocks 45 supported by upper side frame members 28. A motor 46 mounted on a plate 47 also supported on the upper side frame members is adapted to drive shaft 43 through a motor drive sprocket 48, a sprocket 49 keyed to shaft 43 and a sprocket chain 50.

A sprocket chain 51 is mounted on the set of sprockets 36-39 at each side of the device. The arrangement of the sprockets of each set is such that both chains 51 travel identical paths including lower runs elevated from and parallel to dead plate 32, thereafter around sprockets 39, then upwardly and rearwardly at an angle suitably of forty-five degrees to the vertical, around upper forward sprockets 36, in horizontal runs to and then around upper rear sprockets 36 and finally in a vertical run to and around rear lower sprockets 36. The sprocket chains are guided in their horizontal and inclined runs by suitable guideways 52 (see FIG. 4). At least one rod 55 extends between and has its ends rigidly fixed to links of the spaced sprocket chains the rod being adapted to support a pusher unit 16 hereinafter to be described in detail. Where, as illustrated, two pusher units are to be employed, the preferred arrangement, two of the rods 55 are provided spaced one hundred eighty degrees apart. As previously mentioned the ends of the rods are secured to links of the chains (see particularly FIG. 5) to prevent their rotation relatively to the chains. The preferred means comprises socket members 56 fixed to two adjacent chain links in any suitable way the sockets receiving the rod ends which are fixed therein by set screws or the like 57.

Each pusher unit 16 comprises an approximately U-shaped yoke 60 having legs 61 carrying horizontally aligned bearings 62 rotatably receiving the rod 55 associated with that unit. One leg of each unit has an integral extension 59 for a purpose hereinafter explained. Each unit also includes a box-like member 63 defined by side plates 64 which are connected in spaced relationship by the base of yoke 60 and by a plate 65. A pair of parallel links 66 are pivotally secured as by studs 67 to the inner surface of each side plate 64 the studs all lying in the same vertical plane. The outer ends of the links are pivotally secured as by studs 68 to recessed edge portions of a pusher member 69 by studs 68 also all lying in one vertical plane. One, or preferably both, of the lower links 66 is extended readwardly from its studs 67 and has affixed thereto one end of a spring 71 the other end of which is secured to a pin 72 projecting from the adjacent side plate 64.

A cam 75 having a hub 76 is secured to the rod 55 associated with the pusher unit for rotation therewith. A cam follower 77 is carried by one arm 78 of a lever 79 having a hub 80 secured to a shaft 81. The ends of shaft 81 are mounted in bearings 82 carried by side plates 64. Shaft 81 may be fixed against axial shifting by collars 83. Lever 79 has a forwardly projecting arm 84, the outer end of which carriers a horizontal rod 85 with its ends underlying the upper links 66 (see FIG. 5). Cam 75 is so shaped and mounted that follower 77 is on the high point of the cam during the loading stroke and, as illustrated in FIG. 6, rod 85 holds links 66 against the pull of gravity and of spring or springs 71 in such position that the lower edge of pusher plate 69 is elevated somewhat above dead plate 32. As will be noted the arrangement of links 66 and their pivotal connections to side plates 64 and pusher member 69 are such that the pusher member will lie in a vertical plane irrespective of any upward or downward swinging movement of the links.

Means are provided to maintain each pusher unit at all times during its travel with chains 51 in a given position relatively to the vertical. Referring particularly to FIGS. 2, 4 and 7 one of the legs 61 of the U-shaped member 60 of each unit has an extension 59 to which one end of a link 90 is pivotally secured, the other end of the link being pivotally secured to a slider 91. A second link 92 lying parallel to link 90 has one end pivotally secured to said leg 61 equidistant and on the opposite side of the associated rod 55 with the pivot points lying in the same vertical plane. The other end of link 92 is pivotally secured to slider 91 in the same vertical plane with the pivot point of the other link 90. Slider 81 includes a slider element 93 mounted for sliding movement in a track 94 secured to one of the side plates 34. The track may be interrupted as indicated at 95 for passage of the chain 51 therethrough. However as will be noted from FIG. 2 the relative lateral positions of the slider and chain are such that no conflict between them will occur. As will be noted the slider and associated structure for one pusher unit 16 is mounted on one of the side plates and the slider and associated structure for the other unit 16 on the opposite side plate.

In the operation of the loading apparatus described above sprocket chains 51 driven by motor 46 travel in the closed paths defined by sprockets 36 and 39 the chains carrying rods 55 and hence the pusher units supported thereby through a corresponding path. Due to the parallel links 90 and 92 the pusher units are maintained at all times in the same positions relative to the vertical. As each pusher unit travels around lower left-hand sprockets 36 (FIG. 4) and starts its loading run cam follower 77 will be at the high level of cam 75 as previously mentioned whereby pusher member 69 will be held by rod 85 with its lower edge elevated slightly above the dead plate and in position to contact and convey a group of articles deposited on the dead plate. As the chains continue to travel the pusher unit moves along its loading stroke to transport the group of articles along the dead plate and into a case C positioned to receive it. During this loading stroke there will be no relative movement between the cam and cam follower 77 until the links of the chains 51 carrying the ends of the bar 55 begin their travel around the lower forward sprockets 39. As the chain links and bar pass around the sprockets from the point 96 to the point 97 (see FIG. 4) the cam will be rotated through an angle of one hundred thirty-five degrees in the direction indicated by the arrow and the cam follower will move from its position on the high point of the cam, indicated at 98 in FIGS. 4 and 6, to the low point 99. The profile of cam 75 between points 98 and 99 is such and and lever arms 78 and 84 are so proportioned that as the pusher unit is elevated by movement of bar 55 from point 96 to point 97 lever arm 84 is permitted to rotate in a clockwise direction to lower pusher member 69 to the same extent and at the same rate that the bar is raised. Hence pusher member will retain its relationship to the dead plate for the full extent of the forward or loading stroke. Further this relationship will be maintained as the pusher unit is initially retracted as the chain links and bar 55 are carried from their furthest forward point 100 on the sprockets to the point 97. Hence as illustrated in FIG. 3 pusher plate 69 will maintain its elevation relatively to the dead plate during a short retractive movement away from case C to clear the cover flap thereof. Thereafter the pusher member will travel an inclined upward path corresponding to the run of the chains between the forward lower and upper sprockets whereby it will remain clear of the cover flap of the case.

When rod 55 passes with the chains around upward forward sprockets 36 the rod and hence the cam will be further rotated and follower 77 will travel from the low point 99 toward the high level of the cam. Preferably the profile of cam following the low point is such that pusher member 69 is only partially restored to its original position as the chain links carrying the bar pass around these sprockets, the pusher plate being completely restored as the cam is further rotated in the travel of the chains and bar 55 around the upper rear sprocket 36. The two stage elevation of the pusher plate to its original position relatively to the remainder of the pusher unit results in a relatively smooth operation. On the other hand cam 75 may be shaped to entirely restore the pusher plate to its relatively elevated position, or to a higher than normal position if desired, as the chain links and bar pass around the upper forward sprockets to ensure against conflict between the pusher plate, and a particularly high group of the articles placed on the dead plate during the return movement of the pusher unit.

Having thus described the invention in rather complete detail it will be understood that these details need not be strictly adhered to and that various changes and modifications may be made all falling within the scope of the invention as defined by the following claims.

What is claimed is:

1. In a case loading apparatus having means for receiving a group of articles to be loaded into a case at a location adjacent said receiving means, a conveyor traveling in a closed path including a forward run substantially parallel to said receiving means and terminating adjacent said location and an arcuate run leading from the termination of said forward run to a rearwardly inclined run, a pusher unit conveyed by said conveyor means for movement therewith in said closed path, said pusher unit comprising a support means and a pusher element having a forward face lying at a given angle to said support means; the improvement comprising means mounting said pusher element from said support means for vertical adjustment relatively thereto while maintaining said pusher element with its forward face at said given angle, and means carried by said support means and cooperating with said mounting means for maintaining said pusher element at a given vertical position above said receiving means as said pusher unit moves with said conveyor through said forward run and a first portion of said arcuate run.

2. In a case loading apparatus as defined in claim 1 wherein said means mounting said pusher element from said support means comprises parallel linkage.

3. In a case loading apparatus as defined in claim 1 wherein said means carried by said support means comprises a cam, a cam follower and means controlled by said cam follower and cooperating with said mounting means.

4. In a case loading apparatus as defined in claim 2 wherein said means carried by said support means comprises a cam, a cam follower and means controlled by said cam follower cooperating with said parallel linkage.

5. A case loading apparatus as defined in claim 4 wherein said conveyor means comprises spaced sprocket chains, there is a rod having its ends affixed to said chains whereby said rod is rotated during the arcuate run of said conveyor means, said support means is mounted on said rod for rotation relatively thereto, there is means for holding said support means against rotation with said rod, and said cam means is fixed to said rod for rotation therewith.

References Cited

UNITED STATES PATENTS

| | | | |
|---|---|---|---|
| 1,971,875 | 8/1934 | Pert | 198—170 |
| 2,111,700 | 3/1938 | Stokes | |
| 2,781,121 | 2/1957 | Brandenberger | 198—24 X |
| 3,196,811 | 7/1965 | Lefever | 198—24 X |
| 3,244,209 | 4/1966 | Farmer | 198—170 X |

EVON C. BLUNK, *Primary Examiner.*

R. J. HICKEY, *Assistant Examiner.*